US008812220B2

(12) United States Patent
Shinagawa et al.

(10) Patent No.: US 8,812,220 B2
(45) Date of Patent: Aug. 19, 2014

(54) DIAGNOSTIC APPARATUS FOR INTERNAL COMBUSTION ENGINE

(75) Inventors: Tomohiro Shinagawa, Shizuoka-ken (JP); Yuichi Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 50 days.

(21) Appl. No.: 13/534,919

(22) Filed: Jun. 27, 2012

(65) Prior Publication Data

US 2013/0006505 A1 Jan. 3, 2013

(30) Foreign Application Priority Data

Jun. 28, 2011 (JP) ................................. 2011-143414

(51) Int. Cl.
*B60T 7/12* (2006.01)
*G05D 1/00* (2006.01)
*G06F 7/00* (2006.01)
*G06F 17/00* (2006.01)
*G06F 19/00* (2011.01)
*G06G 7/70* (2006.01)

(52) U.S. Cl.
USPC .......................................... 701/108; 701/114

(58) Field of Classification Search
CPC .............. Y02T 10/47; F02M 25/0702; F02M 25/0752; F02M 25/07
USPC .............. 60/605.2; 123/58.8, 568.11, 568.13, 123/568.16, 568.2, 568.21, 568.24, 406.23, 123/406.24, 406.29, 406.32, 406.34, 123/406.37, 406.4, 406.41, 406.44, 435, 123/672, 673, 677, 679; 701/108, 114; 73/35.01, 114.02, 114.69, 114.74
See application file for complete search history.

(56) References Cited

U.S. PATENT DOCUMENTS

| 7,788,020 | B2 * | 8/2010 | Wolf et al. ..................... 701/108 |
| 2011/0023829 | A1 * | 2/2011 | Miyashita ....................... 123/445 |
| 2011/0088674 | A1 * | 4/2011 | Shutty et al. ............. 123/568.21 |
| 2011/0289916 | A1 * | 12/2011 | Dion et al. .................... 60/605.2 |
| 2013/0160750 | A1 * | 6/2013 | Maruyama ............... 123/568.21 |
| 2013/0197786 | A1 * | 8/2013 | Genko .......................... 701/108 |
| 2013/0311070 | A1 * | 11/2013 | Ujiie et al. ................... 701/108 |

FOREIGN PATENT DOCUMENTS

| JP | 2007303326 | A | 11/2007 |
| JP | 2010-077927 | A | 4/2010 |
| JP | 2010106785 | A | 5/2010 |
| JP | 2010-156295 | A | 7/2010 |
| JP | 2010180746 | A | 8/2010 |
| JP | 2011132860 | A | 7/2011 |

* cited by examiner

*Primary Examiner* — John Kwon
*Assistant Examiner* — Sizo Vilakazi
(74) *Attorney, Agent, or Firm* — Gifford, Krass, Sprinkle, Anderson & Citkowski, P.C.

(57) ABSTRACT

A diagnostic apparatus for a multicylinder internal combustion engine includes: an EGR portion capable of executing an individual-cylinder EGR in which EGR gas is distributed and supplied individually to cylinders of the engine; a knock detection portion that detects a knock index value that represents degree of knocking, separately for each of the cylinders; an abnormality detection portion that determines presence or absence of a variation abnormality of air/fuel ratios of the cylinders during execution of the individual-cylinder EGR, and that pinpoints an abnormal cylinder after determining that the variation abnormality is present, and that calculates an imbalance index value that represents the degree of variation regarding the abnormal cylinder; and an abnormality location pinpointing portion that pinpoints an abnormality location in the abnormal cylinder based on the imbalance index value and the knock index value of the abnormal cylinder.

13 Claims, 8 Drawing Sheets

DIAGNOSTIC APPARATUS FOR INTERNAL COMBUSTION ENGINE

CROSS REFERENCE TO RELATED APPLICATIONS

This application claims priority to Japanese Patent Application No. 2011-143414 filed on Jun. 28, 2011, which is incorporated herein by reference in its entirety including the specification, drawings and abstract.

BACKGROUND OF THE INVENTION

1. Field of the Invention

The invention relates to a diagnostic apparatus for an internal combustion engine and, more particularly, to a diagnostic apparatus for a multicylinder internal combustion engine which is capable of executing an individual-cylinder EGR (Exhaust Gas Recirculation) in which EGR gas is distributed and supplied individually to the cylinders.

2. Description of Related Art

In a multicylinder internal combustion engine that performs the individual-cylinder EGR as described above, a plurality of branch EGR passageways are connected one-to-one to a plurality of branch intake passageways that are provided separately for each cylinder. It can happen that in the branch EGR passageway of one of the cylinders, deposit or the like collects, and blocks (or clogs) the passageway. If such a blocking abnormality occurs, amounts of EGR gas vary among the cylinders, resulting in air/fuel ratios varying among the cylinders, which, in some cases, can deteriorate exhaust emissions.

It is desirable that such an air/fuel ratio variation as to deteriorate exhaust emissions as described above be detected as an abnormality. Particularly, in the case of the internal combustion engines used in motor vehicles, in order to prevent a vehicle from traveling with deteriorated exhaust emissions, it has been demanded that an inter-cylinder air/fuel ratio variation abnormality of the engine be detected in a vehicle-mounted state (so-called on-board diagnostics (OBD)).

For example, Japanese Patent Application Publication No. 2010-156295 (JP 2010-156295 A) discloses as an example of the aforementioned countermeasure. That is, when the EGR apparatus is operated, the incidence (rate of occurrence) of knock is found separately for each cylinder by a knock sensor, and ratios of the incidence of knock among the cylinders are calculated. Then, differences between the incidences of knock of the individual cylinders and pre-stored initial incidences of knock of the cylinders are found to diagnose whether there is a deteriorated state of EGR distribution.

In the case where an inter-cylinder air/fuel ratio variation abnormality has occurred, conceivable causes of the abnormality include blockage of the branch EGR passageway of the abnormal cylinder, that is, an EGR system abnormality, a failed injector or the like, that is, a fuel system abnormality, and blockage of a branch intake passageway, that is, an air system abnormality. As for the diagnosis, it is more convenient if the cause of the abnormality or the location of the abnormality can be pinpointed. This contributes to prompt repair afterwards, or the like.

SUMMARY OF THE INVENTION

The invention provides a diagnostic apparatus for an internal combustion engine which, if an inter-cylinder air/fuel ratio variation abnormality occurs, is able to pinpoint the location of abnormality A diagnostic apparatus for a multicylinder internal combustion engine in accordance with one aspect of the invention includes: an EGR portion capable of executing an individual-cylinder EGR in which EGR gas is distributed and supplied individually to cylinders of the multicylinder internal combustion engine; a knock detection portion that detects a knock index value that represents degree of knocking, separately for each of the cylinders; an abnormality detection portion that determines presence or absence of a variation abnormality of air/fuel ratios of the cylinders during execution of the individual-cylinder EGR by the EGR portion, and that pinpoints an abnormal cylinder after determining that the variation abnormality is present, and that calculates an imbalance index value that represents the degree of variation regarding the abnormal cylinder; and an abnormality location pinpointing portion that pinpoints an abnormality location in the abnormal cylinder based on the imbalance index value and the knock index value of the abnormal cylinder.

According to the foregoing aspect of the invention, an excellent effect of being able to pinpoint the location of abnormality if an inter-cylinder air/fuel ratio variation abnormality occurs is achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described hereinafter with reference to the accompanying drawings.

Figure 1:
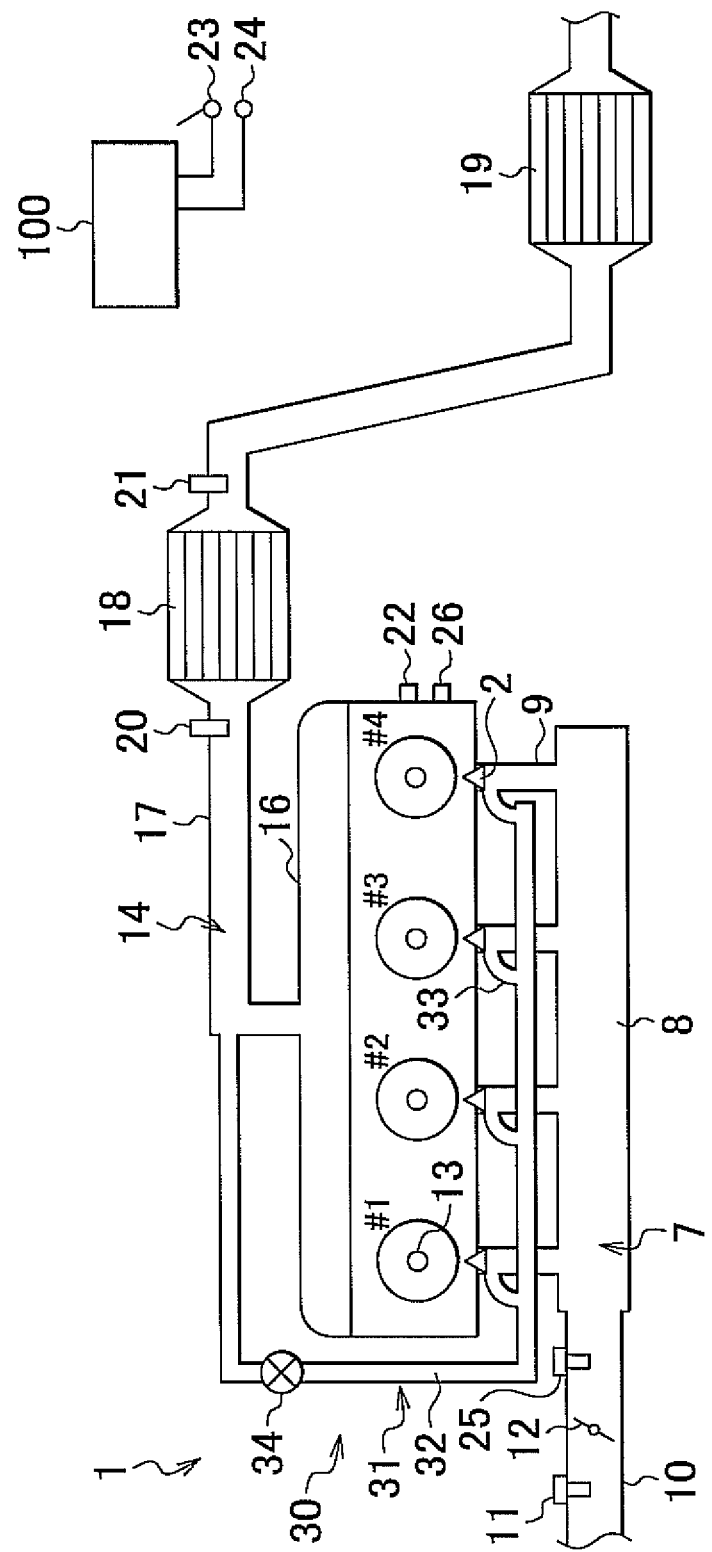
FIG. 1 is a general diagram of an internal combustion engine in accordance with an embodiment of the invention.

FIG. 1 generally illustrates an internal combustion engine in accordance with an embodiment of the invention. An internal combustion engine (engine) 1 shown in FIG. 1 is an in-line four-cylinder spark ignition type internal combustion engine for a motor vehicle. The engine 1 includes four cylinders, that is, #1, #2, #3 and #4 cylinders. However, the engine is not particularly restricted in the engine type, the use, the number of cylinders, etc.

Each cylinder is provided with an injector (fuel injection valve) 2 for injecting fuel. Each injector 2 injects fuel toward an intake passageway of a corresponding one of the cylinders and, particularly, toward an intake port (not shown) thereof.

An intake passageway 7 for introducing intake gas into the cylinders includes the intake ports, and also includes a surge tank 8 as an aggregated portion, a plurality of (four) intake manifolds 9 that connect the intake ports of the cylinders and the surge tank 8, an intake pipe 10 provided on an upstream side of the surge tank 8, etc. Branch pipe portions of the intake manifold 9 and the intake ports of the individual cylinders form their respective branch intake passageways. The intake gas gathered in the surge tank 8 is distributed to the cylinders through the branch intake passageways.

The intake pipe 10 is provided with an air flow meter 11, an electronically controlled throttle valve 12 and intake pressure sensor 25 in that order from an upstream side. The air flow meter 11 outputs a signal commensurate with the intake flow rate. The intake pressure sensor 25 outputs a signal commensurate with the intake gas pressure. The cylinders are provided with ignition plugs 13 for igniting mixture in the cylinders.

An exhaust passageway 14 for discharging exhaust gas includes exhaust ports (not shown) of the cylinders, an exhaust manifold 16 that collects exhaust gas from the exhaust ports, and an exhaust pipe 17 disposed on a downstream side of the exhaust manifold 16. The exhaust pipe 17 is provided with an upstream catalyst 18 and a downstream catalyst 19 each of which is made up of a three-way catalyst.

Branch pipe portions of the exhaust pipe 17 at the upstream side and downstream side of the upstream catalyst 18 (immediately forward and rearward thereof) are provided with air fuel ratio sensors for detecting the air/fuel ratio of exhaust gas, that is, a pre-catalyst sensor 20 and a post-catalyst sensor 21, respectively. These sensors each detect the air/fuel ratio on the basis of the oxygen concentration in exhaust gas.

The engine 1 is provided with an EGR (Exhaust Gas Recirculation) apparatus 30. The EGR apparatus 30 is capable of executing an individual-cylinder EGR in which EGR gas, that is, exhaust gas extracted from the exhaust passageway 14, is distributed and supplied to each of the cylinders.

The EGR apparatus 30 has an EGR passageway 31 that connects the exhaust pipe 17 and the branch pipe portions of the intake manifold 9 that connect to the individual cylinders. The EGR passageway 31 has a main EGR passageway 32 that extends from the exhaust pipe 17 and a plurality of (four) branch EGR passageways 33 that are branched from the main EGR passageway 32 and are connected to the branch pipe portions of the intake manifold 9 that are connected to the cylinders. An EGR valve 34 for adjusting the flow rate of EGR gas is provided in the main EGR passageway 32 upstream of the #1 cylinder's branch EGR passageway 33 that is, of all the branch EGR passageways 33, the most upstream one in the flowing direction of EGR gas. The main EGR passageway 32 may be provided with an EGR cooler.

The engine 1 is provided with an electronic control unit (hereinafter, termed the ECU) 100. The ECU 100 includes a CPU, a ROM, a RAM, an input/output port, a storage device, etc. (none of which is shown). The ECU 100 is electrically connected to the air flow meter 11, the intake pressure sensor 25, the pre-catalyst sensor 20, the post-catalyst sensor 21, and also to a crank angle sensor 22 that detects the crank angle of the engine 1, a knock sensor 26 for detecting the knocking of the engine 1, an accelerator operation amount sensor 23 that detects the accelerator operation amount, a coolant temperature sensor 24 that detects the temperature of an engine coolant, and other various sensors, via A/D converters (not shown) and the like. The ECU 100 controls the injectors 2, the ignition plugs 13, the throttle valve 12, the EGR valve 34, etc. and thereby controls the fuel injection amount, fuel injection timing, the ignition timing, the throttle opening degree, the EGR rate (or the EGR gas flow rate), etc., on the basis of detected values from the various sensors, and the like, so as to achieve a desired output. Incidentally, the throttle opening degree is usually controlled to a degree of opening commensurate with the accelerator operation amount.

The ECU 100, on the basis of a crank pulse signal from the crank angle sensor 22, detects the crank angle, and also detects the number of revolutions of the engine 1. Herein, the "number of revolutions" refers to the number of revolutions per unit time, and means the same as the rotation speed. In this embodiment, the number of revolutions refers to the number of revolutions per minute (rpm). The ECU 100 also detects the amount of intake air per unit time (i.e., the intake air amount) on the basis of the signal from the air flow meter 11. Then, the ECU 100 detects the load of the engine 1 on the basis of at least one of the detected intake air amount and the detected accelerator operation amount.

Figure 2:
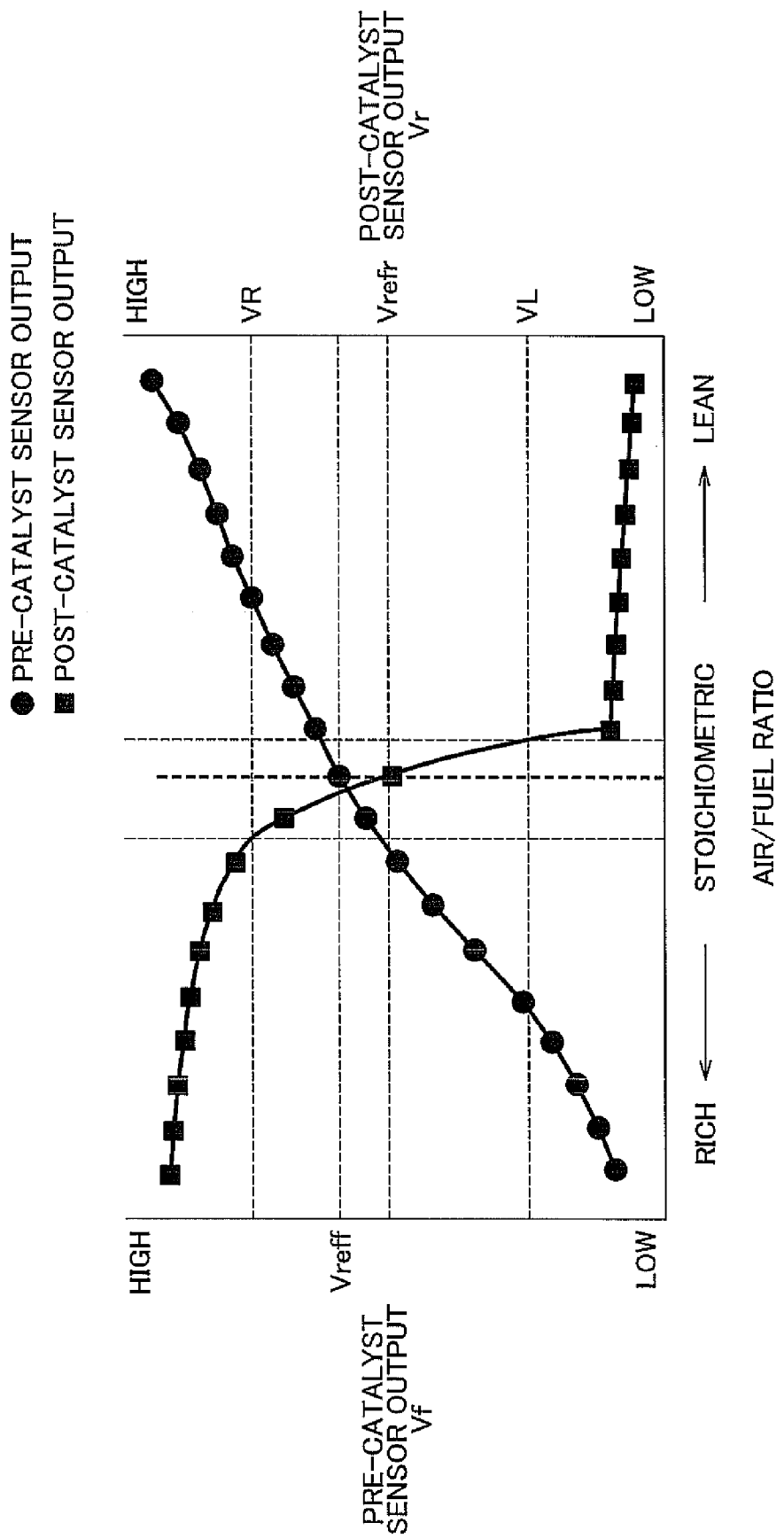
FIG. 2 is a graph showing output characteristics of a pre-catalyst sensor and a post-catalyst sensor in accordance with the embodiment.

The pre-catalyst sensor 20 is made up of a so-called wide-range air/fuel ratio sensor, and is capable of continuously detecting the air/fuel ratio over a relatively wide range. FIG. 2 shows an output characteristic of the pre-catalyst sensor 20. As shown in FIG. 2, the pre-catalyst sensor 20 outputs a voltage signal Vf whose magnitude is proportional to the exhaust air/fuel ratio (pre-catalyst air/fuel ratio A/Ff) that the sensor 20 detects. The output voltage that the pre-catalyst sensor 20 produces when the exhaust air/fuel ratio is stoichiometric (the stoichiometric air/fuel ratio, for example, A/F=14.5) is Vreff (e.g., about 3.3 V).

On the other hand, the post-catalyst sensor 21 is formed by a so-called $O_2$ sensor, and has a characteristic in which the output value of the sensor changes sharply in the vicinity of the stoichiometric ratio. FIG. 2 shows an output characteristic of the post-catalyst sensor 21. As shown in FIG. 2, the output voltage that the sensor 21 produces when the post-catalyst exhaust air/fuel ratio (A/Fr) is stoichiometric, that is, a stoichiometric ratio-corresponding voltage value, is Vrefr (e.g., 0.45 V). The output voltage of the post-catalyst sensor 21 changes within a predetermined range (e.g., of 0 to 1 V). Generally, when the exhaust air/fuel ratio is leaner than the stoichiometric ratio, the output voltage of the post-catalyst sensor is lower than the stoichiometric ratio-corresponding voltage value Vrefr, and when the exhaust air/fuel ratio is richer than the stoichiometric ratio, the output voltage of the post-catalyst sensor is higher than the stoichiometric ratio-corresponding value Vrefr.

Each of the upstream catalyst 18 and the downstream catalyst 19 simultaneously removes NOx, HC and CO, which are pollutants in exhaust gas, when the air/fuel ratio A/F of the exhaust gas that flows into the catalyst is in the vicinity of the stoichiometric ratio. The range (window) of the air/fuel ratio in which the three pollutants can be simultaneously removed with high efficiency is relatively narrow.

Therefore, an air/fuel ratio control (stoichiometric control) for controlling the air/fuel ratio of the exhaust gas that flows into the upstream catalyst 18 to the vicinity of the stoichiometric ratio is executed by the ECU 100. This air/fuel ratio control includes such a main air/fuel ratio control (main air/fuel ratio feedback control) as to cause the exhaust air/fuel ratio detected by the pre-catalyst sensor 20 to be equal to the stoichiometric ratio, which is a predetermined target air/fuel ratio, and such a subsidiary air/fuel ratio control (subsidiary air/fuel ratio feedback control) as to cause the exhaust air/fuel ratio detected by the post-catalyst sensor 21 to be equal to the stoichiometric ratio.

Figure 3:
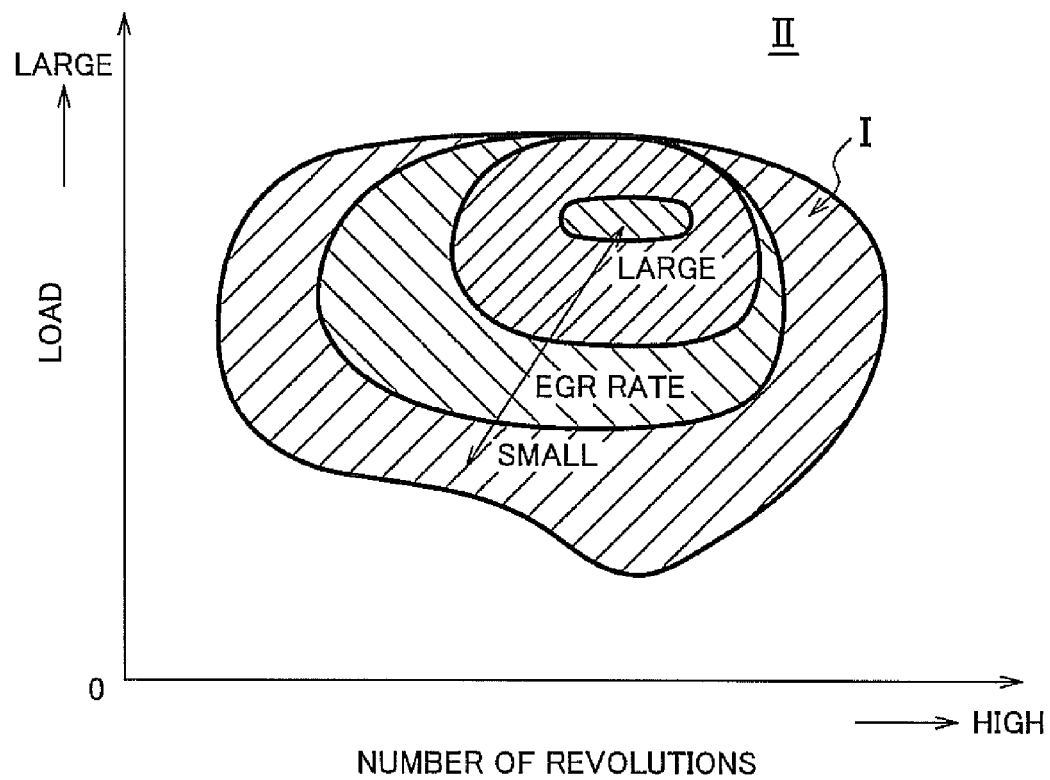
FIG. 3 is an EGR control map in accordance with the embodiment.

Furthermore, the EGR control is executed by the ECU 100. The ECU 100 determines whether to execute the EGR by referring to a map as shown in FIG. 3 on the basis of actual engine parameters detected by sensors or the like (e.g., engine revolution speed and engine load). When the detected actual engine parameters are in an execution-of-EGR region I, the ECU 100 determines that the EGR needs to be executed, and opens the EGR valve 34. Then, the EGR gas is distributed and supplied to the branch pipe portions of the intake manifold 9 connected to the cylinders, through the main EGR passageway 32 and the branch EGR passageways 33. On another hand, when the actual engine parameters are in a non-execution-of-EGR region II, the ECU 100 determines that it is not appropriate to execute the EGR, and completely closes the EGR valve 34.

After determining that the EGR is to be executed, the ECU 100 determines a target EGR rate in accordance with a map as indicated in FIG. 3 in which a relation between the engine parameters and the target EGR rate is determined beforehand. Then, the ECU 100 controls the degree of opening of the EGR valve 34 so that the actual EGR rate equals the determined target EGR rate. Due to this operation, it is possible to realize an EGR rate or an EGR flow rate that is suitable to the actual values of the engine parameters.

Figure 4:
FIG. 4 is a graph showing how the ignition timing is changed in accordance with the embodiment.

On another hand, the ignition timing control is executed by the ECU 100. As shown in FIG. 4, the ECU 100 controls the ignition timing of all the cylinders to θ1 when the EGR is not executed, and controls the ignition timing of all the cylinders to θ2, which is to the advanced side of θ1, when the EGR is executed. Thus, at the time of change from the state where the EGR is not executed (the EGR is absent) to the state where the EGR is executed (the EGR is present), the ignition timings of all the cylinders are uniformly advanced by (θ1−θ2).

The ECU 100 is capable of changing the ignition timing separately for each cylinder. However, the above-described timing advancing/retarding control in accordance with the presence or absence of the EGR is performed uniformly on all the cylinders.

At the same time, the ECU 100 performs a knock control on the basis of the signal from the knock sensor 26. The knock control is a control of causing the actual ignition timing to be close to the MET (Maximum advance for Best Torque, or maximum torque ignition timing) that varies among individual engines and varies depending on the operating condition.

In the engine 1 that performs the above-described individual-cylinder EGR, it can happen that deposit or the like collects in the branch EGR passageway 33 of one or more cylinders (in particular, any one cylinder), and therefore blocks (or clogs) the passageway. If such a blockage abnormality occurs, the amount of EGR gas varies among the cylinders, which can result in variation of air/fuel ratio among the cylinders and therefore deterioration of exhaust emissions.

That is, the EGR gas amount of an abnormal cylinder having the blockage abnormality becomes smaller than the EGR gas amount of the other cylinders, that is, the normal cylinders. Then, the amount of fresh air in the abnormal cylinder increases by an amount that corresponds to the reduction in the EGR gas amount, so that the air/fuel ratio of the abnormal cylinder becomes leaner than the air/fuel ratio of the normal cylinders. In this manner, an air/fuel ratio variation among the cylinders occurs.

In this embodiment, therefore, in order to prevent a vehicle from traveling with deteriorated exhaust emissions, the engine is equipped with a diagnostic apparatus that detects the inter-cylinder air/fuel ratio variation abnormality.

In the case where the inter-cylinder air/fuel ratio variation abnormality occurs, conceivable causes of the abnormality include blockage of the branch EGR passageway 33 of the abnormal cylinder (i.e., an EGR-system abnormality), and also include a fuel system abnormality such as a failed injector 2 or the like, and blockage of a branch intake passageway (the branch pipe portion of the intake manifold 9 or the input port) (i.e., an air-system abnormality). At the time of diagnosis, if the cause of the abnormality or a location of the abnormality can be pinpointed, it is more convenient. This contributes to prompt repair or the like.

Therefore, the diagnostic apparatus of this embodiment is configured so as to be able to pinpoint the cause of the abnormality or the location of the abnormality (abnormality location). This will be described in detail below.

Firstly, the ECU 100 detects a knock index value K that represents the degree of knocking separately for each cylinder, on the basis of the output of the knock sensor 26. The knock index value K may be the strength of knock or the incidence (rate of occurrence) of knock, and the knock index value K is greater as the degree of knocking is greater.

Figure 5A:
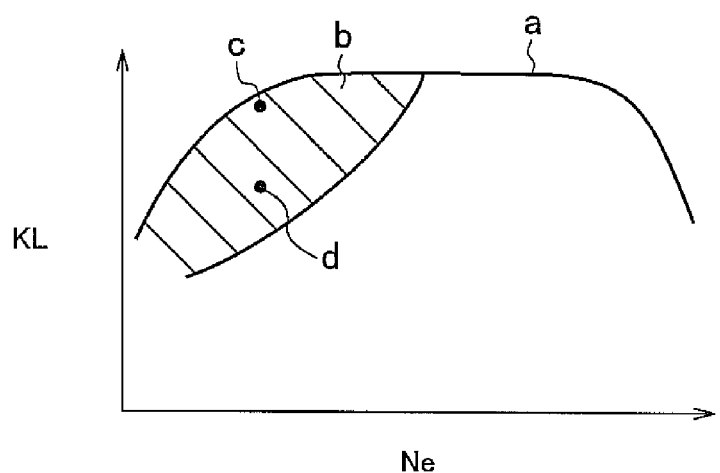
FIGS. 5A to 5C show output signals of a knock sensor and the engine operation region in accordance with the embodiment.
Figure 5B:
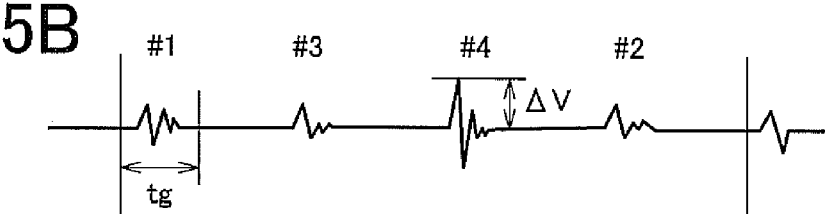
Figure 5C:
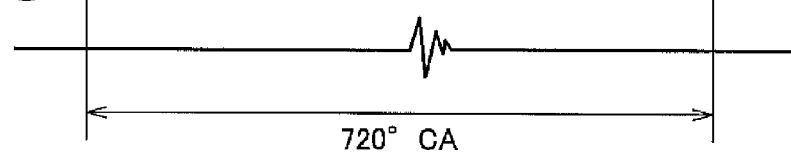

FIG. 5A shows an engine operation region that is defined by the number of revolutions Ne and the load KL. FIGS. 5B and 5C show the output signal of the knock sensor 26.

As shown in FIGS. 5B and 5C, the knock sensor 26 is constructed as a vibration pickup that converts the vibration of the cylinder block in a frequency range characteristic of knocking into an electrical signal, and outputs the electrical signal. The ECU 100 detects the knock index value K on the basis of the output signal of the knock sensor 26 within a gate period tg set in the combustion stroke of each cylinder (e.g., a period from the TDC to 90° CA). The ignition order of the cylinders is the order of the #1, #3, #4 and #2 cylinders.

In FIG. 5A, a line a represents a maximum load line (a so-called WOT line). In the entire operation region, a hatched region b is a knock region in which knocking is apt to occur. This knock region is a region at a side of low revolution speed and high load.

At the time of a conspicuously high load as indicated by a dot c in FIG. 5A, all the cylinders come to have knocking while the degrees of knocking vary as shown in FIG. 5B. In the case where the knock index value K is the strength of knock, the knock index value K is a difference ΔV between the maximum peak of the output signal of the knock sensor within the gate period tg and the background level. This difference ΔV is greater as the degree of knocking is greater. In the example shown in FIG. 5B, a conspicuous knocking is occurring in the #4 cylinder. It is possible to determine that knocking is present if the difference ΔV is greater than a predetermined threshold value ΔVs, and to determine that knocking is absent if the difference ΔV is less than or equal to the predetermined threshold value ΔVs.

On another hand, if the engine load is relatively low as indicated by a dot d in FIG. 5A, knocking occurs only in the #4 cylinder, which is apt to have knocking, as shown in FIG. 5C. In this case, the difference ΔV becomes large only with the #4 cylinder, but the magnitude of the difference ΔV is smaller than in the case shown in FIG. 5B. Thus, since the strength of knock differs depending on the number of revolutions Ne and the load KL, the threshold value ΔVs can be determined by a predetermined map (that may be replaced by a function, which applies in the following description as well) according to the number of revolutions Ne and the load KL. The threshold value ΔVs is larger as the number of revolutions Ne is lower and as the load KL is higher. In this case, too, it can be determined that knocking is present if the difference ΔV is greater than the threshold value ΔVs, and it can be determined that knocking is absent if the difference ΔV is less than or equal to the threshold value ΔVs.

In this embodiment, the knock index value K of each cylinder is the strength of knock of the cylinder in one engine cycle (=720° CA) or the average value of the strengths of knock of the cylinder in a plurality of engine cycles.

Alternatively, the knock index value K can be the incidence of knock. In this case, the number of times of the difference ΔV exceeding the threshold value ΔVs in a plurality of engine cycles is counted separately for each cylinder. Then, this number of times is divided by the number of the engine cycles to obtain the incidence of knocking of each cylinder. For example, if, with regard to the #4 cylinder, the difference ΔV exceeds the threshold value ΔVs four times in five engine cycles, the incidence of knock of the #4 cylinder is 4/5 (=80(%)).

Incidentally, the knock index value K is not limited to the strength of knock or the incidence of knock. Furthermore, the strength of knock and the incidence of knock may also be found by methods different from those described above. It is also permissible to perform a frequency analysis or the like with regard to the output signal of the knock sensor, in accordance with need.

In this embodiment, the ECU 100 determines whether the presence or absence of the variation abnormality regarding the air/fuel ratios of the cylinders during execution of the individual-cylinder EGR by the EGR apparatus 30. If the ECU 100 determines that the variation abnormality is present, the ECU 100 pinpoints a cylinder that has the abnormality, and calculates the imbalance index value that represents the degree of variation of the abnormal cylinder.

The variation abnormality regarding the air/fuel ratios of the cylinders refers to a state in which the air/fuel ratio of one or more cylinders (in particular, any one cylinder) of all the cylinders is different from the air/fuel ratio of the other cylinders, and variation (imbalance) in air/fuel ratio among the cylinders occurs. For example, a state in which the air/fuel ratio of the #1 cylinder deviates to the lean side of the air/fuel ratio of the #2, #3 and #4 cylinders. During execution of the stoichiometric control, the air/fuel ratio of each cylinder is stoichiometric in principle. However, if, for example, the injector 2 of the #1 cylinder has an abnormality of the jet hole being clogged or of valve opening malfunction thereof or the like, the amount of fuel of the #1 cylinder becomes excessively small, so that an air/fuel ratio deviation abnormality (in particular, a lean deviation abnormality) as described above occurs.

In this embodiment, the air/fuel ratio A/F of each cylinder is individually detected on the basis of the output of the pre-catalyst sensor 20. The portions of exhaust gas discharged from the cylinders successively come into contact with the pre-catalyst sensor 20 with a time delay, so that the air/file ratio detected by the pre-catalyst sensor 20 accordingly changes to values that correspond to the air/fuel ratios of the portions of exhaust gas from the cylinders.

Figure 6:
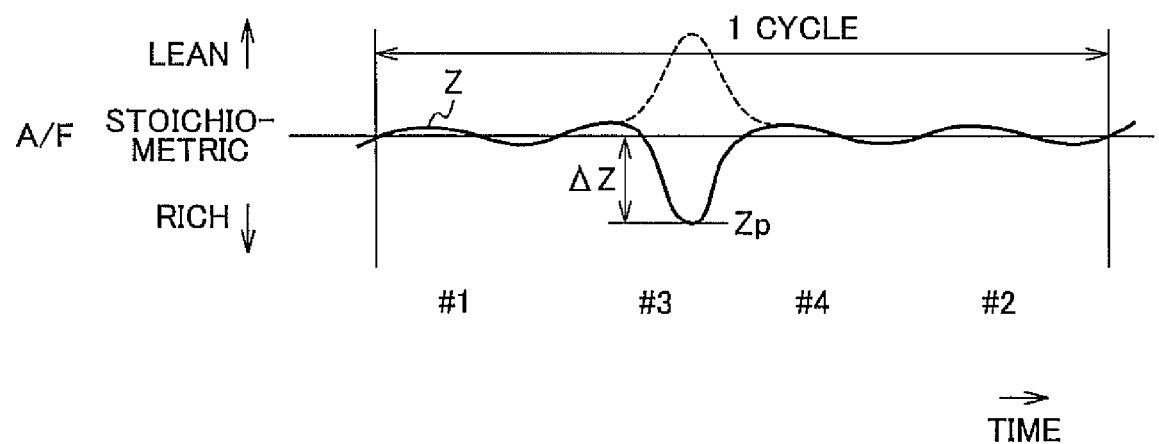
FIG. 6 is a time chart showing changes in the air/fuel ratio detected by a pre-catalyst sensor in accordance with the embodiment.

FIG. 6 shows changes in the detected air/fuel ratio Z provided by the pre-catalyst sensor 20 as described above. The ECU 100 always grasps to which one of the cylinders the detected air/fuel ratio of exhaust gas corresponds, by using a cylinder distinction function installed in the ECU 100 as well as the intake air amount Ga, etc. If within one engine cycle, there is a detected air/fuel ratio that is deviated greatly (i.e., by at least a predetermined value) from the stoichiometric ratio, it is determined that the air/fuel ratio deviation abnormality has occurred. Conversely, if there is not a detected air/fuel ratio deviated greatly from the stoichiometric ratio, it is determined that the air/fuel ratio deviation abnormality is absent.

In this manner, the ECU 100 determines the presence or absence of the variation abnormality or the air/fuel ratio deviation abnormality. The predetermined value herein can be, for example, a value (4.35) that corresponds to 30% of the stoichiometric air/fuel ratio.

In the example shown in FIG. 6, a solid line indicates the case where the rich deviation abnormality occurs in the #3 cylinder. In the example, an interrupted line indicates the case where the lean deviation abnormality occurs in the #3 cylinder. When having determined that the variation abnormality is present, the ECU 100 pinpoints, as an abnormal cylinder, the cylinder whose detected air/fuel ratio Z is deviated from the stoichiometric ratio by at least the predetermined value (the #3 cylinder in the example shown). Then, with regard to this abnormal cylinder, the ECU 100 calculates an imbalance index value that represents the degree of variation (or the degree of deviation).

The ECU 100 calculates an air/fuel ratio difference ΔZ (=14.5−Zp) that is a difference between a peak Zp of the detected air/fuel ratio Z of the abnormal cylinder and the stoichiometric ratio (14.5), and sets the air/fuel ratio difference ΔZ as an imbalance index value IB. As the air/fuel ratio difference ΔZ is greater to the plus side, the degree of rich deviation of the abnormal cylinder is greater. As the air/fuel ratio difference ΔZ is greater to the minus side, the degree of lean deviation of the abnormal cylinder is greater.

Incidentally, the individual-cylinder air/fuel ratio detection method, the variation abnormality detection method, the method of pinpointing an abnormal cylinder, and the imbalance index value calculation method can be accomplished by methods other than those described above. For example, as for the individual-cylinder air/fuel ratio detection method, the output of the air/fuel ratio sensor disposed separately for each cylinder may also be used. As for the variation abnormality detection method, it is also possible to employ a method in which the rotation fluctuation of each cylinder is utilized, a method in which the output of the post-catalyst sensor 21 is utilized, etc. As for the abnormal-cylinder pinpointing method, it is also possible to employ a method in which the amount of fuel injection of each cylinder is sequentially forced to increase or decrease. As for the imbalance index value calculation method, it is possible to employ a method in which the outputs of the air/fuel ratio sensors disposed separately for each cylinder are utilized.

Next, the ECU 100 pinpoints the abnormality location regarding the abnormal cylinder on the basis of the knock index value K and the imbalance index value IB of the abnormal cylinder. This will be described below.

Figure 7:
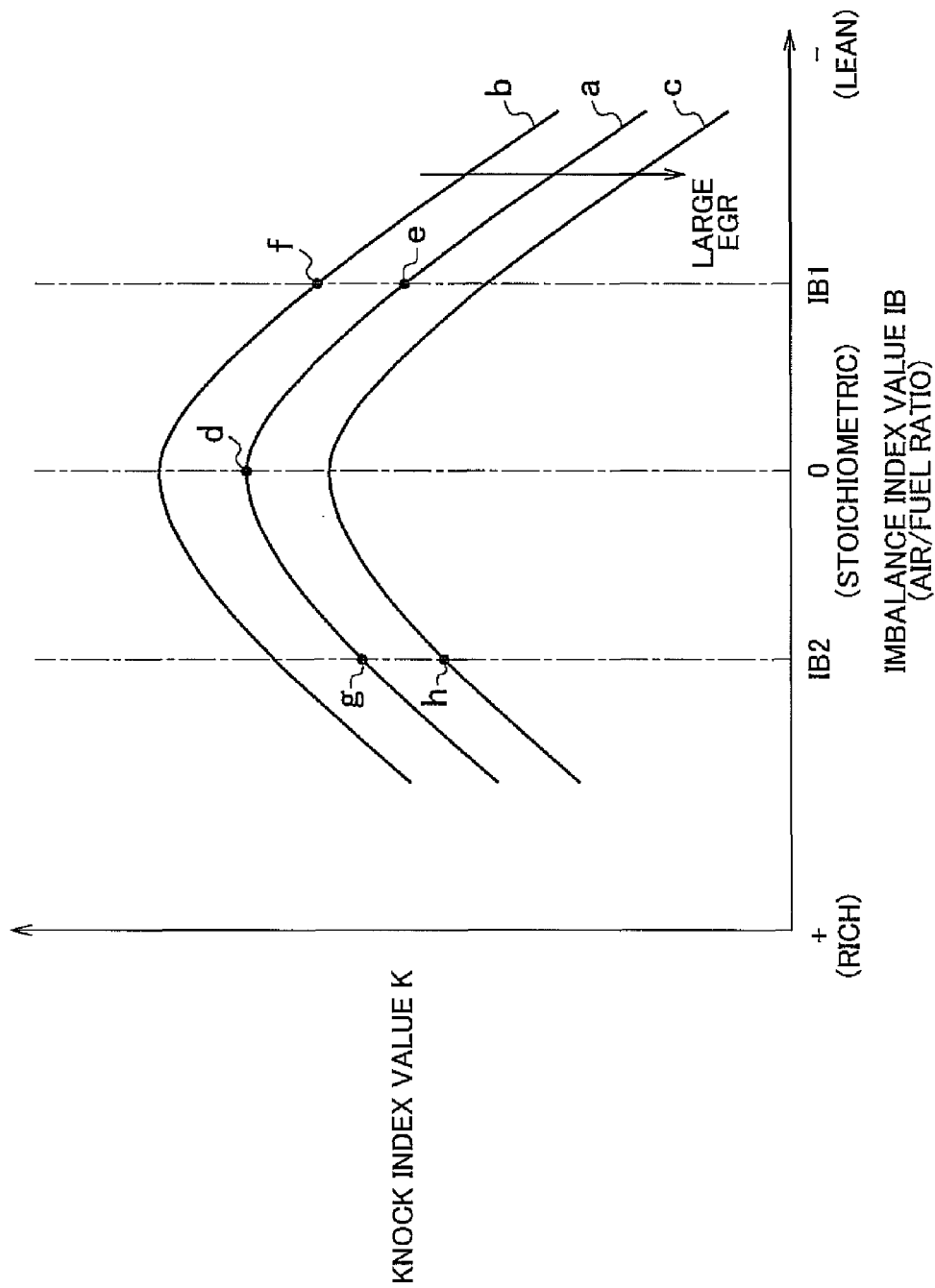
FIG. 7 is a graph showing relations between a knock index value and an imbalance index value in accordance with the embodiment.

FIG. 7 shows relations between the knock index value K and the imbalance index value IB by lines a, b and c. It is to be noted that "IB=0" corresponds to the stoichiometric air/fuel ratio, and "IB<0" corresponds to lean air/fuel ratios, and "IB>0" corresponds to rich air/fuel ratios.

The line a shows the relation between the knock index value K and the imbalance index value IB in the case where the EGR amount is a normal reference amount commensurate with the number of engine revolutions and the engine load. The line b shows the relation between the knock index value K and the imbalance index value IB in the case where the EGR amount is smaller than in the case of the line a. The line c shows the relation between the knock index value K and the imbalance index value IB in the case where the EGR amount is larger than in the case of the line a.

As shown in FIG. 7, the knock index value K becomes maximum when the air/fuel ratio is in the vicinity of the stoichiometric air/fuel ratio, and tends to decrease as the air/fuel ratio deviates from the stoichiometric air/fuel ratio regardless of whether it deviates to the lean side or the rich side.

A point d shows the case where the air/fuel ratio of one particular cylinder (particular cylinder) is the stoichiometric ratio, which is a normal ratio, and the EGR amount is a normal reference value. This state is realized when the stoichiometric control and the EGR control are executed normally with regard to the particular cylinder.

On another hand, in the case where the lean deviation abnormality has occurred, conceivable causes of the abnormality include decrease in the amount of fuel injection and decrease of the EGR amount. This is because it is usually unthinkable that the fuel injection amount and the EGR amount remain unchanged and the intake air amount increases with regard to only one cylinder.

Conceivable causes of decrease in the fuel injection amount include the clogging of the jet hole of the injector 2 of a particular cylinder, valve opening malfunction thereof, fuel supply malfunction, etc. A cause of the decrease in the EGR amount is considered to be that the intake air amount increases by an amount that corresponds to the decrease in the EGR amount, resulting in occurrence of the lean deviation abnormality. The decrease in the EGR amount is considered to be caused by blockage of the branch EGR passageways 33 of a particular cylinder due to deposit or the like.

Therefore, if the lean deviation abnormality is detected, either one of the fuel system and the EGR system is pinpointed as being the abnormality location.

It is to be noted herein that in the case of the fuel system abnormality, the point d moves to a point e on the same line a. On the other hand, in the case of the EGR system abnormality, the point d moves to a point f on the line b at the smaller EGR side. That is, the lines a to c in FIG. 7 are lines along which the intake air amount and the EGR amount both remain unchanged and only the amount of fuel injection changes.

Utilizing this difference, the location of abnormality is pinpointed as being one location. That is, in the case of the fuel system abnormality, the amount of decline in the knock index value K from the point d corresponding to the time of normality to the point e corresponding to the time of abnormality is relatively large. In the case of the EGR system abnormality, however, the amount of decline in the knock index value K from the point d corresponding to the time of normality to the point f corresponding to the time of abnormality is relatively small or null. Hence, a difference ($\Delta K1 = K0 - K1$) between a knock index value K0 that corresponds to the imbalance index value (IB=0) prior to occurrence of the abnormality and a knock index value K1 that corresponds to the imbalance index value IB1 obtained after the abnormality occurs is compared with a predetermined first threshold value $\alpha 1$. When the difference $\Delta K1$ is greater than the first threshold value $\alpha 1$, the fuel system is pinpointed as being the abnormality location. When the difference $\Delta K1$ is less than or equal to the first threshold value $\alpha 1$, the EGR system is pinpointed as being the abnormality location.

It is to be particularly noted herein that the first threshold value $\alpha 1$ is variably set on the basis of the imbalance index value IB1 obtained after the abnormality occurs. As the imbalance index value IB1 is greater to the minus side (lean side), the first threshold value $\alpha 1$ is greater. This is because, as shown in FIG. 7, as the imbalance index value IB1 becomes greater to the minus side (lean side), the amount of decline in the knock index value K from the point d corresponding to the time of normality to the point e corresponding to the time of abnormality becomes greater.

By variably setting the first threshold value $\alpha 1$ on the basis of the imbalance index value IB1 as described above, it becomes possible to use an appropriate threshold value commensurate with the degree of air/fuel ratio deviation (degree of lean deviation), and therefore to improve the diagnostic accuracy.

Alternatively, the abnormality location may be pinpointed by using only the knock index value K1 that corresponds to the imbalance index value IB1 obtained after occurrence of the abnormality. Specifically, the knock index value K at the point e corresponding to the time of the fuel system abnormality is smaller than the knock index value K at the point f corresponding to the time of the EGR system abnormality. Hence, the knock index value K1 that corresponds to the post-occurrence-of-abnormality imbalance index value IB1 is compared with a predetermined second threshold value $\alpha 2$. When the knock index value K1 is smaller than the second threshold value $\alpha 2$, the fuel system is pinpointed as being the abnormality location. When the knock index value K1 is greater than or equal to the second threshold value $\alpha 2$, the EGR system is pinpointed as being the abnormality location.

In this case, too, the second threshold value $\alpha 2$ is variably set on the basis of the post-occurrence-of-abnormality imbalance index value IB1. As the imbalance index value IB1 is greater to the minus side (lean side), the second threshold value $\alpha 2$ is smaller. This is because, as shown in FIG. 7, as the imbalance index value IB1 becomes greater to the minus side (lean side), the knock index value K at the point e corresponding to the time of abnormality becomes smaller.

Thus, also by variably setting the second threshold value $\alpha 2$ on the basis of the imbalance index value IB1 as described above, it becomes possible to use an appropriate threshold value commensurate with the degree of air/fuel ratio deviation (degree of lean deviation), and therefore to improve the diagnostic accuracy.

Next, description will be made in conjunction with the case where a rich deviation abnormality has occurred. In this case, conceivable causes of the abnormality include an increase in the fuel injection amount and a decrease in the intake air amount. This is because it is usually unthinkable that the fuel injection amount and the intake air amount remain unchanged and the EGR amount increases only with regard to one cylinder.

Conceivable causes of increase in the fuel injection amount include the clogging of the jet hole of the injector 2 of a particular cylinder, valve closure malfunction thereof, excessive fuel supply, etc. A cause of the decrease in the intake air amount is considered to be that the EGR amount increases by an amount that corresponds to the decrease in the intake air amount, resulting in occurrence of the rich deviation abnormality. The decrease in the intake air amount is considered to be caused by blockage of the branch intake passageway of a particular cylinder and, in particular, cylinder's branch pipe portion of the intake manifold 9 upstream of the connecting portion between the branch pipe portion and the branch EGR passageway 33 due to deposit or the like.

Therefore, if the rich deviation abnormality is detected, either one of the fuel system and the air system is pinpointed as being the abnormality location.

It is to be noted herein that in the case of the fuel system abnormality, the point d moves to a point g on the same line a. On the other hand, in the case of the air system abnormality, the point d moves to a point h on the line c at the larger EGR side.

Utilizing this difference, the abnormality location is pinpointed as being one location. That is, in the case of the fuel system abnormality, the amount of decline in the knock index value K from the point d corresponding to the time of normality to the point g corresponding to the time of abnormality is relatively small. In the case of the air system abnormality, however, the decline in the knock index value K from the point d corresponding to the normality time to the point h corresponding to the abnormality time is relatively large. Hence, a difference ($\Delta K2 = K0 - K2$) between the knock index value K0 that corresponds to the imbalance index value (IB=0) prior to occurrence of the abnormality and a knock index value K2 that corresponds to an imbalance index value IB2 obtained after the abnormality occurs is compared with a predetermined third threshold value $\alpha 3$. When the difference $\Delta K2$ is greater than the third threshold value $\alpha 3$, the air system is pinpointed as being the abnormality location. When the difference $\Delta K2$ is less than or equal to the third threshold value $\alpha 3$, the fuel system is pinpointed as being the abnormality location.

The third threshold value $\alpha 3$ is also variably set on the basis of the imbalance index value IB2 obtained after occurrence of the abnormality. As the imbalance index value IB2 is greater to the plus side (rich side), the third threshold value $\alpha 3$ is greater. This is because, as shown in FIG. 7, as the imbalance index value IB2 becomes greater to the plus side (rich side), the amount of decline in the knock index value K from the point d corresponding to the time of normality to the point g corresponding to the time of abnormality becomes greater.

By variably setting the third threshold value $\alpha 3$ on the basis of the imbalance index value IB2 as described above, it becomes possible to use an appropriate threshold value commensurate with the degree of air/fuel ratio deviation (degree of rich deviation), and therefore to improve the diagnostic accuracy.

Alternatively, the location of abnormality may be pinpointed by using only the knock index value K2 that corresponds to the imbalance index value IB2 obtained after occurrence of the abnormality. Specifically, the knock index value K at the point h corresponding to the time of the air system abnormality is smaller than the knock index value K at the point g corresponding to the time of the fuel system abnormality. Hence, the knock index value K2 that corresponds to the post-occurrence-of-abnormality imbalance index value IB2 is compared with a predetermined fourth threshold value $\alpha 4$. When the knock index value K2 is smaller than the fourth threshold value $\alpha 4$, the air system is pinpointed as being the abnormality location. When the knock index value K2 is greater than or equal to the fourth threshold value $\alpha 4$, the fuel system is pinpointed as being the abnormality location.

The fourth threshold value $\alpha 4$ is also variably set on the basis of the post-occurrence-of-abnormality imbalance index value IB2. As the imbalance index value IB2 is larger to the plus side (rich side), the fourth threshold value $\alpha 4$ is smaller. This is because, as shown in FIG. 7, as the imbalance index value IB2 becomes larger to the plus side (rich side), the knock index value K at the point g corresponding to the time of abnormality becomes smaller.

Thus, also by variably setting the fourth threshold value $\alpha 4$ on the basis of the imbalance index value IB2 as described above, it becomes possible to use an appropriate threshold value commensurate with the degree of air/fuel ratio deviation (degree of rich deviation), and therefore to improve the diagnostic accuracy.

Figure 8:
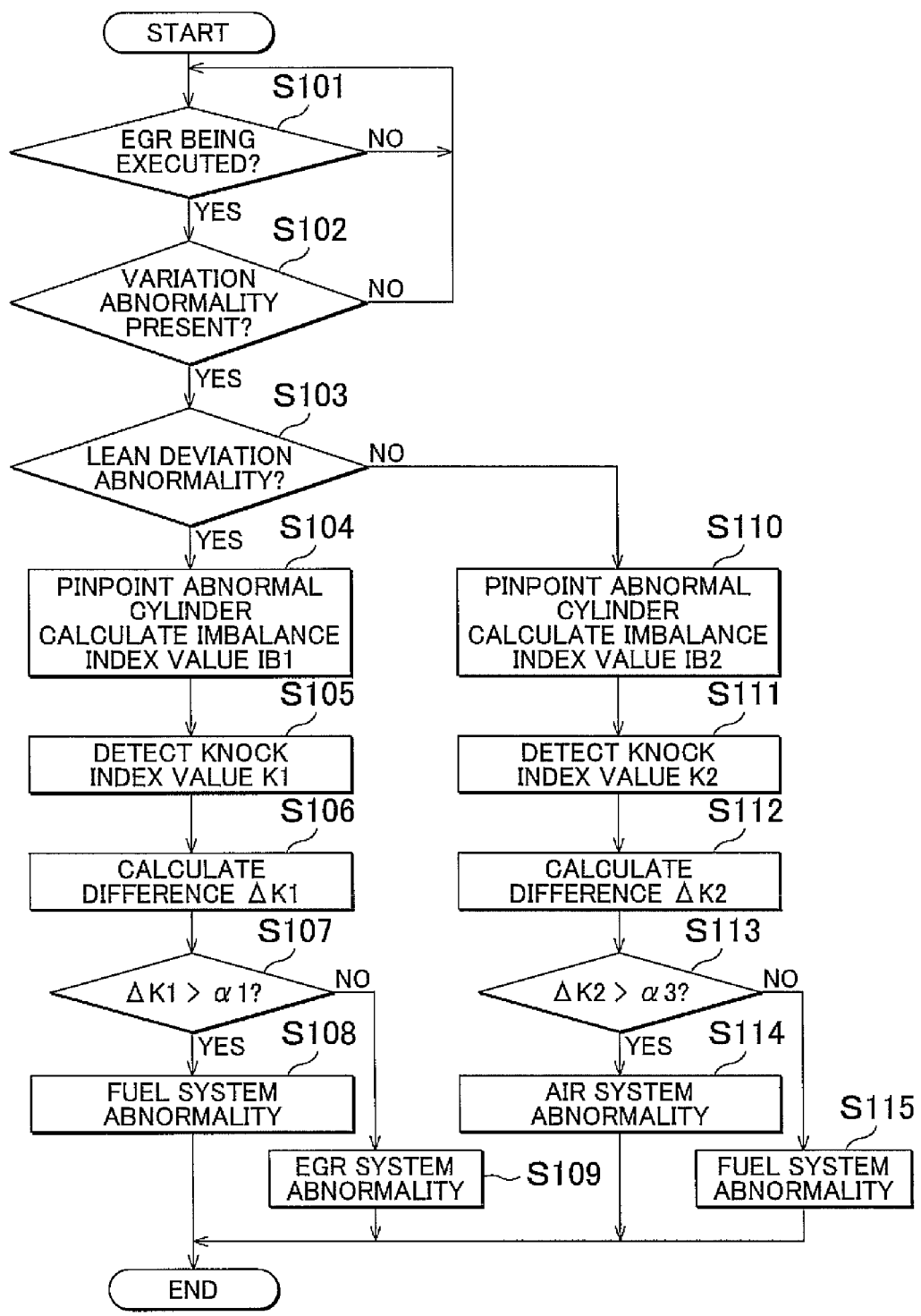
FIG. 8 is a flowchart of a diagnostic process in accordance with the embodiment.

Next, a diagnostic process in accordance with the embodiment will be described with reference to FIG. 8. This diagnostic process is executed by the ECU 100 preferably during execution of the stoichiometric control.

Initially, in step S101, it is determined whether the EGR is being executed. In this step, the ECU 100 determines that the EGR is being executed if the detected number of revolutions Ne and the load KL of the engine are within the execution-of-EGR region I in the map shown in FIG. 3, and the ECU 100 determines that the EGR is not being executed, if the number of revolutions Ne and the load KL are not in the execution-of-EGR region I (if the number of revolutions Ne and the load KL are in the non-execution-of-EGR region II).

If it is determined that the EGR is being executed, the process proceeds to step S102, in which the presence or absence of the variation abnormality is determined. If it is determined that the variation abnormality is present, the process proceeds to step S103. As described above, if the value of the detected air/fuel ratio Z of each cylinder that is detected by the pre-catalyst sensor 20 is deviated from the stoichiometric ratio by a predetermined value or more, it is determined that the variation abnormality is present, and if not, it is determined that the variation abnormality is absent.

On the other hand, if in step S101 it is determined that the EGR is not being executed, or if in step S102 it is determined that the variation abnormality is absent, the process returns to step S101, so that a waiting state is assumed.

In step S103, it is determined whether the type of the variation abnormality is a lean deviation abnormality. If it is determined that the variation abnormality is a lean deviation abnormality, the process proceeds to step S104. If it is determined that the variation abnormality is not a lean deviation abnormality, that is, if it is determined that the variation abnormality is a rich deviation abnormality, the process proceeds to step S110.

In this example, it is determined that the variation abnormality is a lean deviation abnormality if the value of the detected air/fuel ratio Z deviated from the stoichiometric ratio by the predetermined value or more is leaner than the stoichiometric ratio. If the value of the detected air/fuel ratio Z is richer than the stoichiometric ratio, it is determined that the variation abnormality is a rich deviation abnormality.

In step S104, an abnormal cylinder is pinpointed, and the imbalance index value IB1 of the abnormal cylinder is calculated. That is, as described above, a cylinder that corresponds to the detected air/fuel ratio Z deviated from the stoichiometric ratio by the predetermined value or more is pinpointed as being an abnormal cylinder. Then, the air/fuel ratio difference $\Delta Z (=14.5 - Zp)$ that is a difference between the peak Zp of the detected air/fuel ratio Z of the abnormal cylinder and the stoichiometric ratio is calculated as an imbalance index value IB1. Since, in this case, the variation deviation is a lean deviation abnormality, the minus imbalance index value IB1 is calculated.

Next, in step S105, the knock index value K1 at the present time, that is, after the abnormality occurs, is detected. This detection is performed on the basis of the output signal of the knock sensor 26 as described above.

Subsequently, in step S106, a difference ($\Delta K1 = K0 - K1$) between the knock index value K0 that corresponds to the imbalance index value (IB=0) prior to the occurrence of the abnormality and the knock index value K1 that corresponds to the imbalance index value IB1 after the abnormality occurs is calculated. The knock index value K0 prior to occurrence of the abnormality may be a value that is actually detected before the abnormality is detected under the same engine operation condition as after the abnormality occurs, or may also be a value obtained from a predetermined map. In the case where the knock index value K0 prior to occurrence of the abnormality is obtained from the map, values of the knock index value K0 corresponding to the number of revolutions Ne and the load KL are input in the map beforehand. The knock index value K1 after the abnormality occurs is a value detected in step S105.

After that, in step S107, the calculated difference ΔK1 is compared with the predetermined first threshold value α1. The first threshold value α1 is variably set according to a predetermined map on the basis of the imbalance index value IB1 calculated in step S104. The greater to the minus side (lean side) the imbalance index value IB1, the greater the first threshold value α1. This is because, as explained above with reference to FIG. 7, the greater to the minus side (lean side) the imbalance index value IB1 is, the greater the amount of decline in the knock index value K from the point d corresponding to the time of normality to the point e corresponding to the time of abnormality is.

If the difference ΔK1 is greater than the first threshold value α1, the process proceeds to step S108, in which the fuel system is pinpointed as being the abnormality location. If the difference ΔK1 is less than or equal to the first threshold value α1, the process proceeds to step S109, in which the EGR system is pinpointed as being the abnormality location.

On the other hand, if in step S103 it is determined that the variation abnormality is a rich deviation abnormality, the abnormal cylinder is pinpointed in step S110, in which calculation of the imbalance index value IB2 of the abnormal cylinder is also performed. The method of pinpointing the abnormal cylinder is the same as in step S104. As for calculation of the imbalance index value IB2, a plus imbalance index value IB2 is calculated, unlike the calculation in step S104.

Next, in step S111, a knock index value K2 at the present time point, that is, after occurrence of the abnormality, is detected. Then, in step S112, a difference (ΔK2=K0−K2) between the knock index value K0 that corresponds to the pre-occurrence-of-abnormality imbalance index value (IB=0) and the knock index value K2 that corresponds to the post-occurrence-of-abnormality imbalance index value IB2 is calculated.

After that, in step S113, the calculated difference ΔK2 is compared with the third threshold value α3. The third threshold value α3, too, is variably set according to a predetermined map on the basis of the imbalance index value IB2 calculated in step S110. The larger to the plus side (rich side) the imbalance index value IB2, the larger the third threshold value α3. This is because, as explained above with reference to FIG. 7, the larger to the plus side (rich side) the imbalance index value IB2 is, the larger the amount of decline in the knock index value K from the point d corresponding to the time of normality to the point g corresponding to the time of abnormality is.

If the difference ΔK2 is larger than the third threshold value α3, the process proceeds to step S114, in which the air system is pinpointed as being the abnormality location. If the difference ΔK2 is less than or equal to the third threshold value α3, the process proceeds to step S115, in which the fuel system is pinpointed as being the abnormality location.

Information regarding the abnormality location pinpointed as described above is stored in the ECU 100. Due to this, at a stage of repair afterwards, the abnormality location can be immediately repaired, and thus operation can be promptly performed. Of course, information regarding the fact that the variation abnormality was present, the type of the variation abnormality, the abnormal cylinder, etc. is also stored in the ECU 100. Besides, it is determined that the variation abnormality is present, a warning apparatus (a warning light or the like) is activated to notify a user of the fact of the presence of the abnormality.

Thus, according to the embodiment, if the inter-cylinder air/fuel ratio variation abnormality occurs, the location of abnormality can be pinpointed, which contributes to prompt repair afterwards, or the like.

Figure 9:
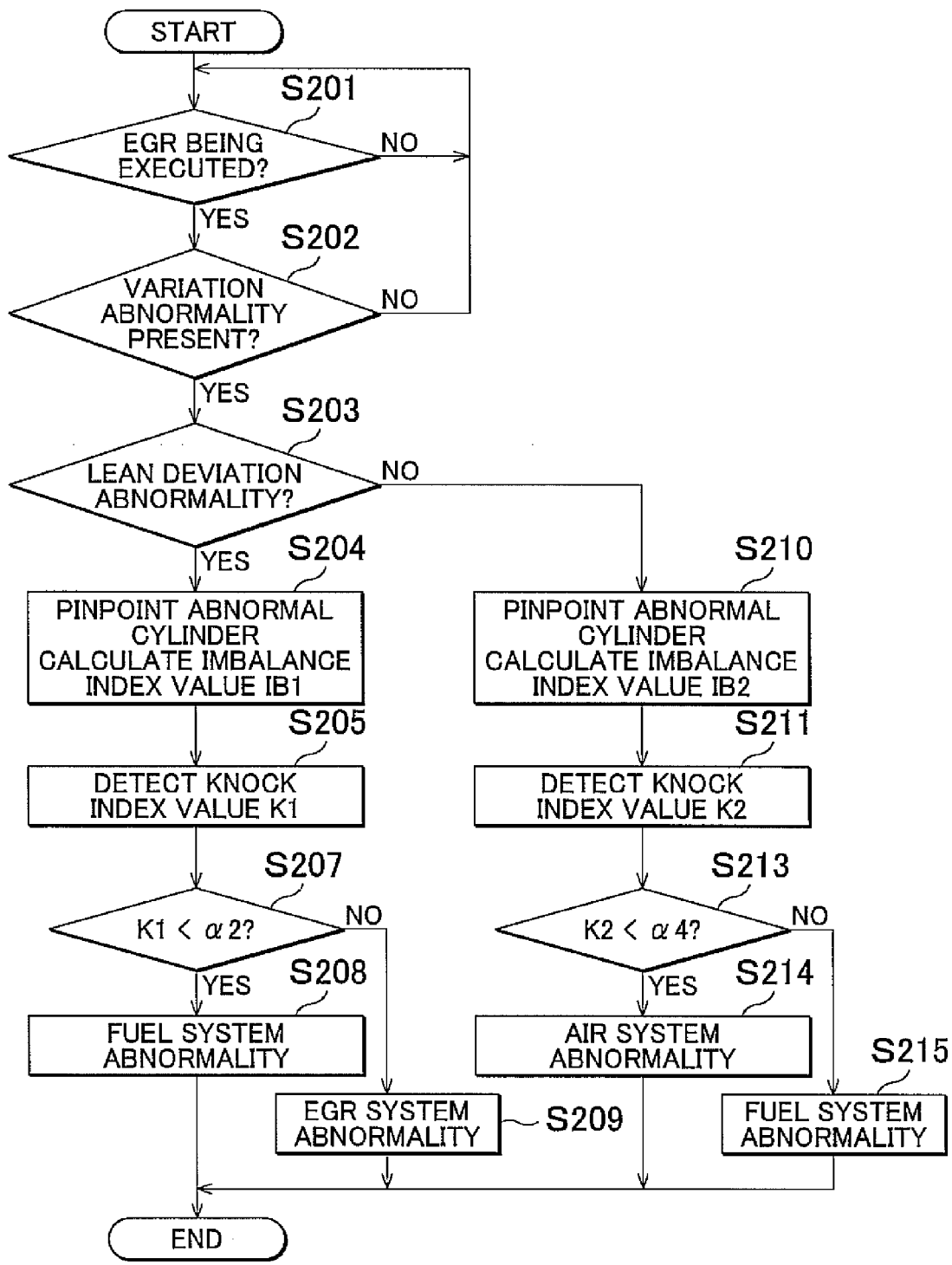
FIG. 9 is a flowchart of a modification of the diagnostic process in accordance with the embodiment.

Next, a modification of the diagnostic process in accordance with the embodiment will be described with reference to FIG. 9. This modification is similar to the basic example shown in FIG. 8, and differences of the modification from the basic example will be mainly described below.

The modification is different from the basic example in that instead of using the differences ΔK1 and ΔK2 in the knock index value between before and after the abnormality occurs, only the post-occurrence-of-abnormality knock index values K1 and K2 are used. Therefore, steps that correspond to steps S106 and S112 in the basic example are omitted in the modification. Steps S201 to S205, S210 and S211 of the modification are the same as steps S101 to S105, S110 and S111 of the basic example.

After the knock index value K1 after the lean deviation abnormality occurs is detected in step S205, the knock index value K1 is compared with the second threshold value α2 in step S207. The second threshold value α2 is variably set according to a predetermined map on the basis of the imbalance index value IB1 calculated in step S204. The larger to the minus side (lean side) the imbalance index value IB1, the smaller the second threshold value α2. This is because, as explained above with reference to FIG. 7, the larger to the minus side (lean side) the imbalance index value IB1 is, the smaller the value of the knock index value K at the point e corresponding to the time of abnormality is.

If the knock index value K1 is smaller than the second threshold value α2, the process proceeds to step S208, in which the fuel system is pinpointed as being the abnormality location. If the knock index value K1 is greater than or equal to the second threshold value α2, the process proceeds to step S209, in which the EGR system is pinpointed as being the abnormality location.

On the other hand, after the knock index value K2 after the rich deviation abnormality occurs is detected in step S211, the knock index value K2 is compared with the fourth threshold value α4 in step S213. The fourth threshold value α4, too, is variably set according to a predetermined map on the basis of the imbalance index value IB2 calculated in step S210. The larger to the plus side (rich side) the imbalance index value IB2, the smaller the fourth threshold value α4. This is because, as explained above with reference to FIG. 7, the larger to the plus side (rich side) the imbalance index value IB2 is, the smaller the value of the knock index value K at the point g corresponding to the time of abnormality is.

If the knock index value K2 is smaller than the fourth threshold value α4, the process proceeds to step S214, in which the air system is pinpointed as being the abnormality location. If the knock index value K2 is greater than or equal to the fourth threshold value α4, the process proceeds to step S215, in which the fuel system is pinpointed as being the abnormality location.

While preferred embodiments of the invention have been described in detail above, other various embodiments of the invention are conceivable. For example, the numerical values shown above are merely illustrative, and can be changed to other numerical values. The internal combustion engine may also be, for example, of the direct injection type or of the dual injection type. Different methods of pinpointing the abnormality location may be used at the time of lean deviation abnormality and at the time of rich deviation abnormality. For example, at the time of lean deviation abnormality, the abnormality location is pinpointed on the basis of the difference in the knock index value between before and after the occurrence of the abnormality, and at the time of rich deviation abnormality, the abnormality location is pinpointed on the basis of only the knock index value obtained after the occurrence of the abnormality.

The embodiments of the invention are not limited to the foregoing embodiment or the like, but the invention includes all the modifications, applications, equivalents that are encompassed in the idea of the invention defined by the appended claims. Therefore, the invention should not be interpreted in a limited manner, but can also be applied to other arbitrary technologies that belong to the range of the idea of the invention.

What is claimed is:

1. A diagnostic apparatus for an internal combustion engine, comprising:
    an EGR portion capable of executing an individual-cylinder EGR in which EGR gas is distributed and supplied individually to cylinders of the internal combustion engine;
    a knock detection portion programmed to detect a knock index value that represents a degree of knocking, separately for each of the cylinders;
    an abnormality detection portion programmed to determine a presence or an absence of a variation abnormality, in which air/fuel ratios of the cylinders vary among the cylinders, during execution of the individual-cylinder EGR by the EGR portion, and programmed to pinpoint an abnormal cylinder when determining that the variation abnormality is present, and programmed to calculate an imbalance index value that represents degree of variation regarding the abnormal cylinder; and
    an abnormality location pinpointing portion programmed to pinpoint an abnormality location in the abnormal cylinder based on the imbalance index value and the knock index value of the abnormal cylinder.

2. The diagnostic apparatus according to claim 1, wherein the abnormality location pinpointing portion programmed to pinpoint one of a fuel system, an air system and an EGR system as being the abnormality location.

3. The diagnostic apparatus according to claim 1, wherein:
    the abnormality detection portion programmed to, when determining that the variation abnormality is present, determine whether the variation abnormality is a lean deviation abnormality, in which the air/fuel ratio of the abnormal cylinder deviates to a lean side as compared to the air/fuel ratio of a normal cylinder, or a rich deviation abnormality, in which the air/fuel ratio of the abnormal cylinder deviates to a rich side as compared to the air/fuel ratio of a normal cylinder; and
    the abnormality location pinpointing portion programmed to, when the abnormality detection portion determines that the variation abnormality present is the lean deviation abnormality, pinpoint one of a fuel system and an EGR system of the abnormal cylinder as being the abnormality location.

4. The diagnostic apparatus according to claim 3, wherein:
    the abnormality location pinpointing portion programmed to compare a difference between a pre-occurrence-of-abnormality knock index value of the abnormal cylinder and a post-occurrence-of-abnormality knock index value of the abnormal cylinder with a predetermined first threshold value, and pinpoints one of the fuel system and the EGR system as being the abnormality location according to a result of comparison of the difference with the first threshold value; and
    the abnormality location pinpointing portion programmed to variably set the first threshold value based on the imbalance index value calculated by the abnormality detection portion.

5. The diagnostic apparatus according to claim 4, wherein:
    the abnormality location pinpointing portion programmed to pinpoint the fuel system as being the abnormality location if the difference is greater than the first threshold value; and
    the abnormality location pinpointing portion programmed to pinpoint the EGR system as being the abnormality location if the difference is less than or equal to the first threshold value.

6. The diagnostic apparatus according to claim 3, wherein:
    the abnormality location pinpointing portion programmed to compare a post-occurrence-of-abnormality knock index value of the abnormal cylinder with a predetermined second threshold value, and the abnormality location pinpointing portion programmed to pinpoint one of the fuel system and the EGR system as being the abnormality location according to a result of comparison of the post-occurrence-of-abnormality knock index value of the abnormal cylinder with the second threshold value; and
    the abnormality location pinpointing portion programmed to variably set the second threshold value based on the imbalance index value calculated by the abnormality detection portion.

7. The diagnostic apparatus according to claim 6, wherein:
    the abnormality location pinpointing portion programmed to pinpoint the fuel system as being the abnormality location if the post-occurrence-of-abnormality knock index value of the abnormal cylinder is less than the second threshold value; and
    the abnormality location pinpointing portion programmed to pinpoint the EGR system as being the abnormality location if the post-occurrence-of-abnormality knock index value of the abnormal cylinder is greater than or equal to the second threshold value.

8. The diagnostic apparatus according to claim 1, wherein:
    the abnormality detection portion programmed to, when determining that the variation abnormality is present, determine whether the variation abnormality is a lean deviation abnormality, in which the air/fuel ratio of the abnormal cylinder deviates to a lean side as compared to the air/fuel ratio of a normal cylinder, or a rich deviation abnormality, in which the air/fuel ratio of the abnormal cylinder deviates to a rich side as compared to the air/fuel ratio of a normal cylinder; and
    the abnormality location pinpointing portion programmed to, when the abnormality detection portion determines that the variation deviation present is the rich deviation abnormality, pinpoint one of a fuel system and an air system as being the abnormality location.

9. The diagnostic apparatus according to claim 8, wherein:
    the abnormality location pinpointing portion programmed to compare a difference between a pre-occurrence-of-abnormality knock index value of the abnormal cylinder and a post-occurrence-of-abnormality knock index value of the abnormal cylinder with a predetermined third threshold value, and the abnormality location pinpointing portion programmed to pinpoint one of the air system and the fuel system as being the abnormality location according to a result of comparison of the difference with the third threshold value; and the abnormality location pinpointing portion programmed to variably set the third threshold value based on the imbalance index value calculated by the abnormality detection portion.

10. The diagnostic apparatus according to claim 9, wherein:

the abnormality location pinpointing portion programmed to pinpoint the air system as being the abnormality location if the difference is greater than the third threshold value; and the abnormality location pinpointing portion programmed to pinpoint the fuel system as being the abnormality location if the difference is less than or equal to the third threshold value.

11. The diagnostic apparatus according to claim 8, wherein:

the abnormality location pinpointing portion programmed to compare a post-occurrence-of-abnormality knock index value of the abnormal cylinder with a predetermined fourth threshold value, and the abnormality location pinpointing portion programmed to pinpoint one of the air system and the fuel system as being the abnormality location according to a result of comparison of the post-occurrence-of-abnormality knock index value of the abnormal cylinder with the fourth threshold value; and the abnormality location pinpointing portion programmed to variably set the fourth threshold value based on the imbalance index value calculated by the abnormality detection portion.

12. The diagnostic apparatus according to claim 11, wherein:

the abnormality location pinpointing portion programmed to pinpoint the air system as being the abnormality location if the post-occurrence-of-abnormality knock index value of the abnormal cylinder is less than the fourth threshold value; and the abnormality location pinpointing portion programmed to pinpoint the fuel system as being the abnormality location if the post-occurrence-of-abnormality knock index value of the abnormal cylinder is greater than or equal to the fourth threshold value.

13. The diagnostic apparatus according to claim 1, wherein the knock detection portion is programmed to detect the knock index value that represents the degree of knocking based on an output of a knock sensor, separately for each of the cylinders.

* * * * *